US008985672B2

(12) United States Patent
Siciliano (10) Patent No.: US 8,985,672 B2
(45) Date of Patent: Mar. 24, 2015

(54) INFLATABLE COVER (76) Inventor: Michael A. Siciliano, Gunter, TX (US)

( * ) Notice: Subject to any disclaimer, the term of this patent is extended or adjusted under 35 U.S.C. 154(b) by 175 days.

(21) Appl. No.: 13/517,589

(22) Filed: Jun. 13, 2012

(65) Prior Publication Data
US 2012/0318416 A1 Dec. 20, 2012

Related U.S. Application Data (60) Provisional application No. 61/497,343, filed on Jun. 15, 2011.

(51) Int. Cl.
B60J 11/04 (2006.01)

(52) U.S. Cl.
CPC ...................... B60J 11/04 (2013.01)
USPC .................................... 296/136.02

(58) Field of Classification Search
CPC .................. B60J 11/00; B60J 11/04
USPC .................................... 296/136.02
See application file for complete search history.

(56) References Cited

U.S. PATENT DOCUMENTS

| | | | | |
|---|---|---|---|---|
| 5,050,924 A * | 9/1991 | Hansen | .................... | 296/100.15 |
| 5,350,000 A | 9/1994 | Wang | | |
| 5,890,525 A | 4/1999 | Shores | | |
| 5,941,594 A | 8/1999 | O'Neill | | |
| 6,044,881 A * | 4/2000 | Welch et al. | .................. | 150/166 |
| 6,099,067 A * | 8/2000 | Butterworth | ............. | 296/136.07 |
| 6,439,644 B1 * | 8/2002 | Jester | ........................ | 296/136.02 |
| 7,360,820 B2 * | 4/2008 | Tellez | ....................... | 296/136.02 |
| 7,640,698 B2 * | 1/2010 | Graham | ......................... | 52/2.17 |
| 2006/0260210 A1 * | 11/2006 | Tanielian et al. | .............. | 52/2.11 |
| 2007/0034264 A1 * | 2/2007 | Kunz et al. | ..................... | 137/554 |
| 2007/0284023 A1 * | 12/2007 | Sitarz | ............................ | 150/166 |
| 2008/0239077 A1 * | 10/2008 | Kurylo | .......................... | 348/148 |
| 2010/0096052 A1 | 4/2010 | Graham | | |
| 2010/0107238 A1 * | 4/2010 | Stedman et al. | ................. | 726/13 |
| 2011/0056486 A1 * | 3/2011 | North | ........................... | 126/706 |
| 2011/0226346 A1 * | 9/2011 | Basin et al. | ................. | 137/87.01 |
| 2011/0303207 A1 * | 12/2011 | Shober et al. | .................... | 124/54 |
| 2011/0313651 A1 * | 12/2011 | Hyde et al. | ..................... | 701/200 |
| 2011/0316279 A1 * | 12/2011 | Bahari et al. | .................... | 290/44 |
| 2011/0316954 A1 * | 12/2011 | Komatsu | ........................ | 347/171 |
| 2012/0089385 A1 * | 4/2012 | Hsu et al. | ......................... | 703/19 |
| 2012/0112964 A1 * | 5/2012 | Thill et al. | ............. | 343/700 MS |

* cited by examiner

Primary Examiner — Dennis H Pedder
(74) Attorney, Agent, or Firm — Craig Hoersten (57) ABSTRACT Inflatable cover apparatus is disclosed in which a double-layer shroud is configured for encompassing a vehicle or other relatively large object. An inflatable chamber is defined by an inner layer and an outer layer of the shroud connected at their peripheries. A drawstring assembly encircles the periphery of the shroud and may be secured in a constricted state or released to an extended state. A blower adapted to inflate the inflatable chamber is capable of maintaining the shroud in an active inflated state in order to shield the covered object from being impacted by falling objects such as hail. A control module controls the blower and provides a communication circuit for enhancing control.

19 Claims, 6 Drawing Sheets

INFLATABLE COVER

PRIORITY ENTITLEMENT

This application is entitled to priority based on Provisional Patent Application Ser. No. 61/497,343 filed on Jun. 15, 2011, which is incorporated herein for all purposes by this reference. This application and the Provisional Patent Application have at least one common inventor.

TECHNICAL FIELD

The invention relates to covers for vehicles or other large objects. More particularly, the invention relates to inflatable cover apparatus for protecting objects from hail and windblown or falling debris.

BACKGROUND

Hail capable of causing damage to vehicles, outdoor grills, generators, etc., is possible in most regions. In some areas, golf ball sized or larger hail is not uncommon. In some instances, potential for vehicle damage exists due to debris blown by strong winds. Tree branches or other organic matter, for example, may cause damage to vehicle body components or glass. Conventional covers known in the art are generally designed to lie in contact with the covered object, such as a vehicle. Such covers afford some protection from the elements, but are ineffective in protecting against the hazards of hail and/or windblown debris. Inflatable vehicle covers have been proposed, but are generally ineffective for various reasons. Known prior art includes various devices which purport to offer some protection from hail. For example, U.S. Patent Publication 2010/0096052, describes an "inflatable bladder" vehicle covering. A remote inflation unit is used to inflate a bladder to a static, sealed, state. In another example, the "inflatable protective covers" of U.S. Patent Publication 2007/0284023, provides static, sealed, covers inflated to a thickness of one to three inches. U.S. Pat. No. 7,360,820 describes apparatus with an inflatable airway chamber sealed after inflation. In U.S. Pat. No. 5,941,594 a structure including a number of thin inflatable bags is described. The bags are designed to be inflated to a static inflated state. Various problems with these examples of the prior art are inherent in their static nature, including efforts to minimize inflation time, and providing and manipulating adequate valves or other sealing mechanisms. Of course, static designs are susceptible to failure by leakage, and once leaking, cannot be re-inflated. In many cases, the thicknesses and/or air density of the proposed inflatable covers is not adequate to prevent damage from large hail. In U.S. Pat. No. 6,439,644 a flexible vehicle cover is described as "having an air blower for constantly supplying air". Problems remain in the art, however, such as attaining the specified speed of inflation, attaining and maintaining appropriate inflated pressure, and maintaining an inflated cover thickness sufficient to protect from hail, all of which must be accomplished using materials and blowers portable enough to be practical. On the whole, the prior art does not adequately address the need for a portable, inflatable, cover capable of resisting large hail, e.g., up to softball-sized.

Due to these and other problems and potential problems, there is a need for effective and practical portable, inflatable, covers capable of protecting vehicles, or other large objects stored outdoors, from relatively large hail and debris. Further, a need exists for inflatable covers having communication capabilities and operating mechanisms suitable for internet and/or telephonic, RF, or other remote access.

SUMMARY OF THE INVENTION

In carrying out the principles of the present invention, in accordance with preferred embodiments, the invention provides advances in the arts with novel apparatus directed to providing portable, smart, inflatable cover apparatus.

According to aspects of the invention, examples of preferred embodiments of inflatable cover apparatus include a double-layer shroud designed to fit over a vehicle or other object. Inner and outer layers of the shroud are connected around the periphery forming an inflatable chamber within. A drawstring around the periphery of the shroud is used to secure the shroud to the object. A blower assembly attached to the shroud has at least one blower positioned at a blower port in the outer shroud such that air can be blown into the inflatable chamber. An electronic control module is included, providing functionality for controlling the blower and providing a communication circuit for affecting remote operation.

According to aspects of the invention, examples of preferred embodiments of the inflatable cover apparatus may further include a control module endowed with internet access functionality.

According to aspects of the invention, examples of inflatable cover apparatus in preferred embodiments may also include data transmission circuitry in the control module.

According to aspects of the invention, examples of preferred embodiments may include inflatable cover apparatus having electronic sensor apparatus operable in cooperation with the control module.

According to another aspect of the invention, preferred embodiments may also include location-determining apparatus.

According to another aspect of the invention, preferred embodiments of inflatable cover apparatus according to the invention may further include circuitry for automatically actuating a blower based on one or more pre-selected parameters.

According to another aspect of the invention, preferred embodiments of the invention may include energy harvesting apparatus.

The invention has advantages including but not limited to one or more of: providing effective protection from airborne hazards such as large hail; providing inflatable cover apparatus having communications capabilities and selectable control functionality; and providing a portable, cost-effective format useable with numerous vehicle models or object shapes. These and other potential advantageous, features, and benefits of the present invention can be understood by one skilled in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features as well as advantages of the invention.

DESCRIPTION OF PREFERRED EMBODIMENTS

Figure 1:
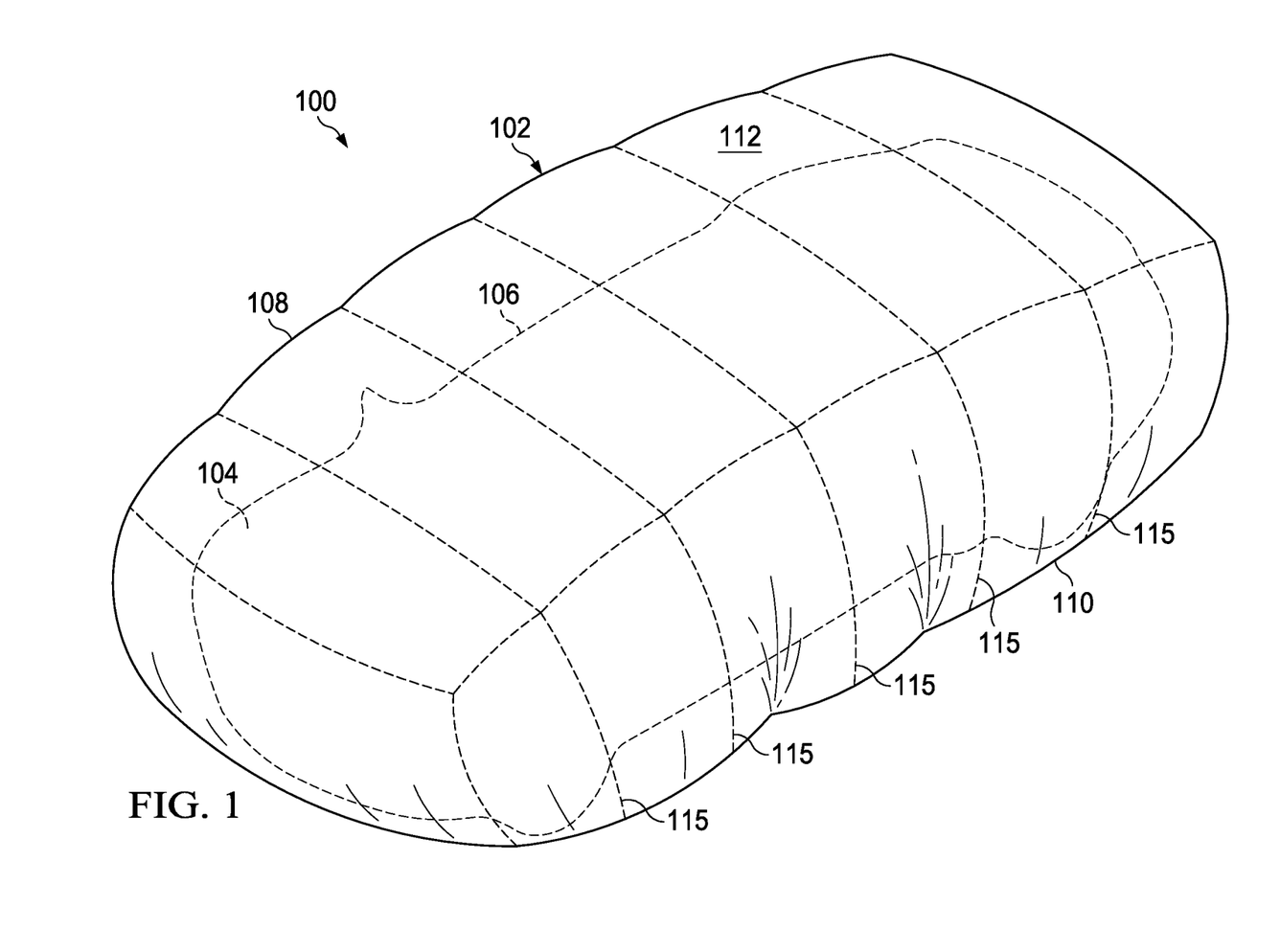
FIG. 1 is a perspective view of an example of a preferred embodiment of inflatable cover apparatus of the invention.

The inventor has devised novel and useful portable inflatable cover apparatus for protecting vehicles or other objects from being impacted by hail or other falling objects. The apparatus may be implemented in relatively few sizes and form factors applicable for use with most commercially available passenger vehicles and common outdoor appliances and equipment. In preferred embodiments, the inflatable cover apparatus of the invention may be activated and/or monitored remotely using available communication devices and protocols. Referring initially to FIG. 1, an example of a preferred embodiment of the inflatable cover apparatus 100 of the invention is shown in a vehicle cover implementation. A double-layer shroud 102 is configured for encompassing a vehicle 104 (not part of the invention). Alternative views of the invention are shown in FIGS. 2-6. The double-layer shroud 102 has an inner layer 106 and an outer layer 108 connected at their peripheries 110. Preferably, the shroud 102 material is lightweight weatherproof fabric such as a two layer lightweight poly material (for example, 80 to 110 grams per square meter or similar). An inflatable chamber 112 is formed between inner layer 106 and the outer layer 108. Preferably, the outer layer 108 is larger than the inner layer 106 at the top of the shroud 102 and larger in width (door to door and front to rear with respect to an associated vehicle) by at least approximately three inches on each side. Preferably, the outer layer 108 is also larger than the inner layer 106, at the top of the shroud 102, in length (hood to trunk) by at least approximately four inches on each side. The inner and outer layers 106, 108, are preferably approximately equal in length and width at the periphery 110 (bottom in the Figures) of the shroud 102 and taper to the unequal lengths at the top to define the inflatable chamber 112. The outer layer 108 is securely attached, preferably sewn, to the inner layer 106 around the entire periphery 110. The inflatable chamber 112 of the shroud 102 arrangement allows enough slack to accommodate inflation adaptable to protect various size/shape vehicles within the same sized shroud, for example, the same "subcompact" shroud may be used to protect a multitude of vehicles in the same "subcompact" class without significant concern for length, height, mirror position or other specific elements.

In a passive state (deflated), the shroud 102 acts as a cover to shield the vehicle 104 within from weather phenomena such as sun, snow, and rain. Preferably, elastic bands 115 are positioned at intervals around the outer layer 108 to hold the shroud 102 close to the covered object 104 when in a deflated state. In an active state (inflated), the shroud 102 provides a stand-off cushioning cover, providing a barrier of pressurized air around the vehicle 104 causing hail, or other objects, to bounce off, preventing damage to the vehicle 104. The shroud 102 may be implemented in many sizes for a variety of vehicles or other large objects. It is contemplated that a relatively small selection of shroud sizes may be used to accommodate the vast majority of commercially available vehicles, e.g., motorcycle, subcompact, compact, midsize, large car, small pickup, standard pickup, small wagon, medium wagon, large wagon, van, boats, and possibly other larger, smaller, or specialized sizes. The apparatus 100 is preferably small and light enough to be stored in a bag and kept in the trunk or other storage compartment of a vehicle. Variations in the shape of the shroud 102 may be used as long as the shroud in its active state provides a protective inflated layer of air on the sides, top, front and rear of the vehicle. In some cases it may be preferable to implement the inflatable cover apparatus 100 in embodiments designed to cover more than one vehicle at the same time. It should also be appreciated that the apparatus of the invention may also be used in the context of objects other than vehicles, such as for example, outdoor cooking equipment or construction or farm machinery.

Figure 3B:
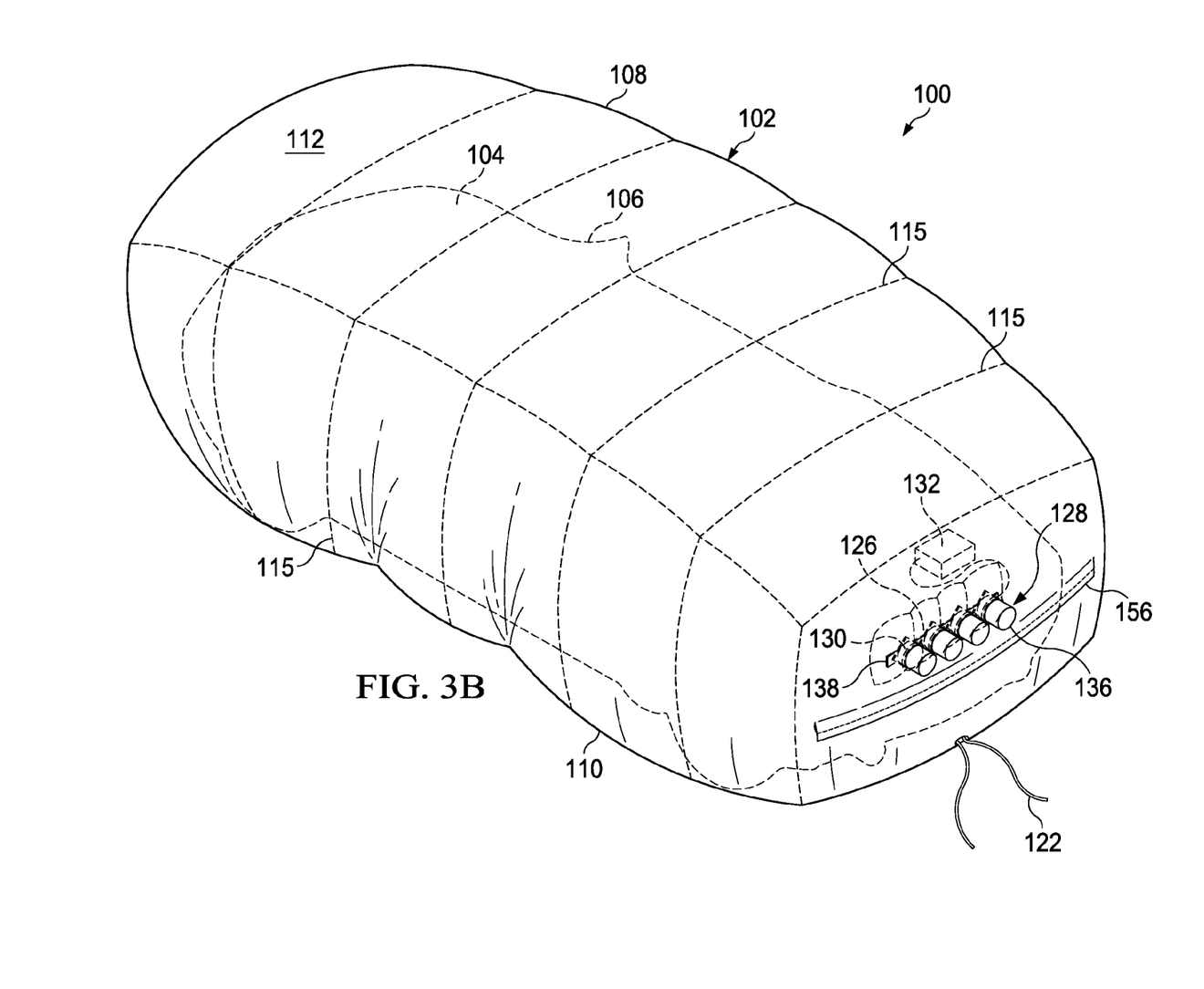
FIG. 3B is a perspective view of an example of a preferred embodiment of inflatable cover apparatus of the invention in an inflated state.
Figure 4:
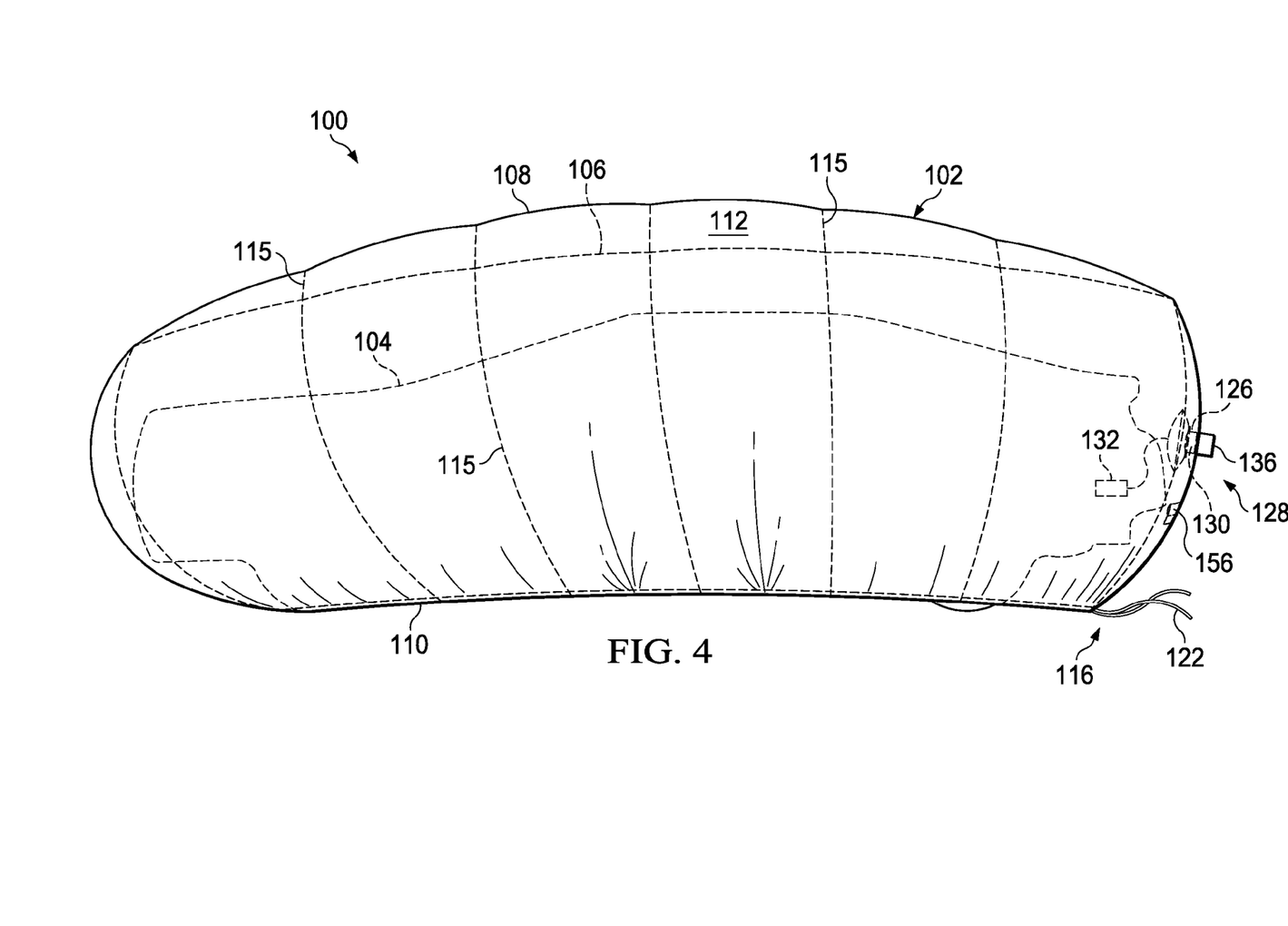
FIG. 4 is a side view illustrating an example of a preferred embodiment of inflatable cover apparatus according to the invention in an inflated state.
Figure 5:
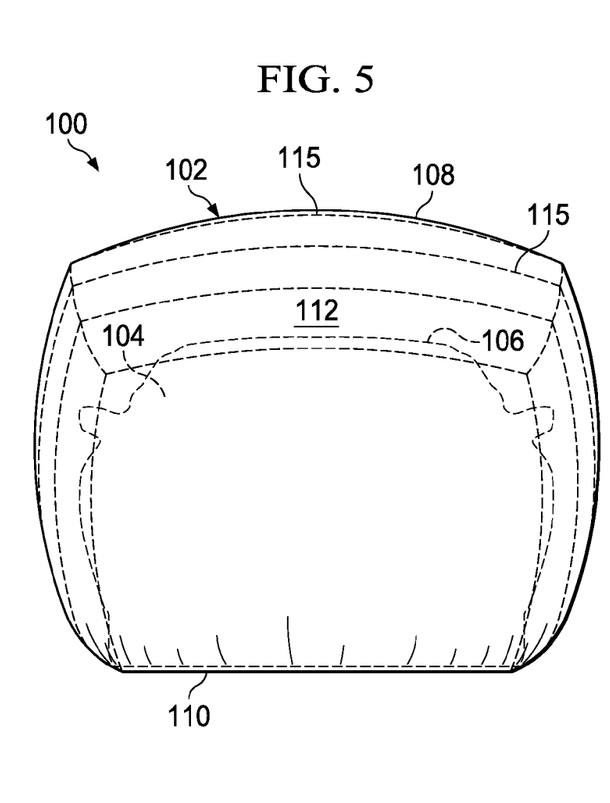
FIG. 5 is a rear view illustrating an example of a preferred embodiment of inflatable cover apparatus according to the invention in an inflated state.

The periphery 110 of the shroud 102 includes a drawstring mechanism 116, see, e.g., FIG. 4. The drawstring mechanism 116 preferably encircles the entire periphery 110 of the shroud 102 and may be retained by suitable means, such as, for example, eyelets or sleeves incorporated into the shroud 102. A drawstring 122 of synthetic cord is deployed within the retaining means, e.g., eyelets and may be made fast in a secured position, preferably by a securing mechanism such as a tie off cinch wand 124 as shown in FIG. 3B, or other securing device. It is contemplated that the periphery 110 of the shroud 102 may thus be deployed around the bottom edges of a vehicle (104) and may be securely held in place by drawing the drawstring 122 to a constricted state. Conversely, the apparatus 100 may be removed from the vehicle (104) with the drawstring 122 in a relaxed, extended state.

Figure 2:
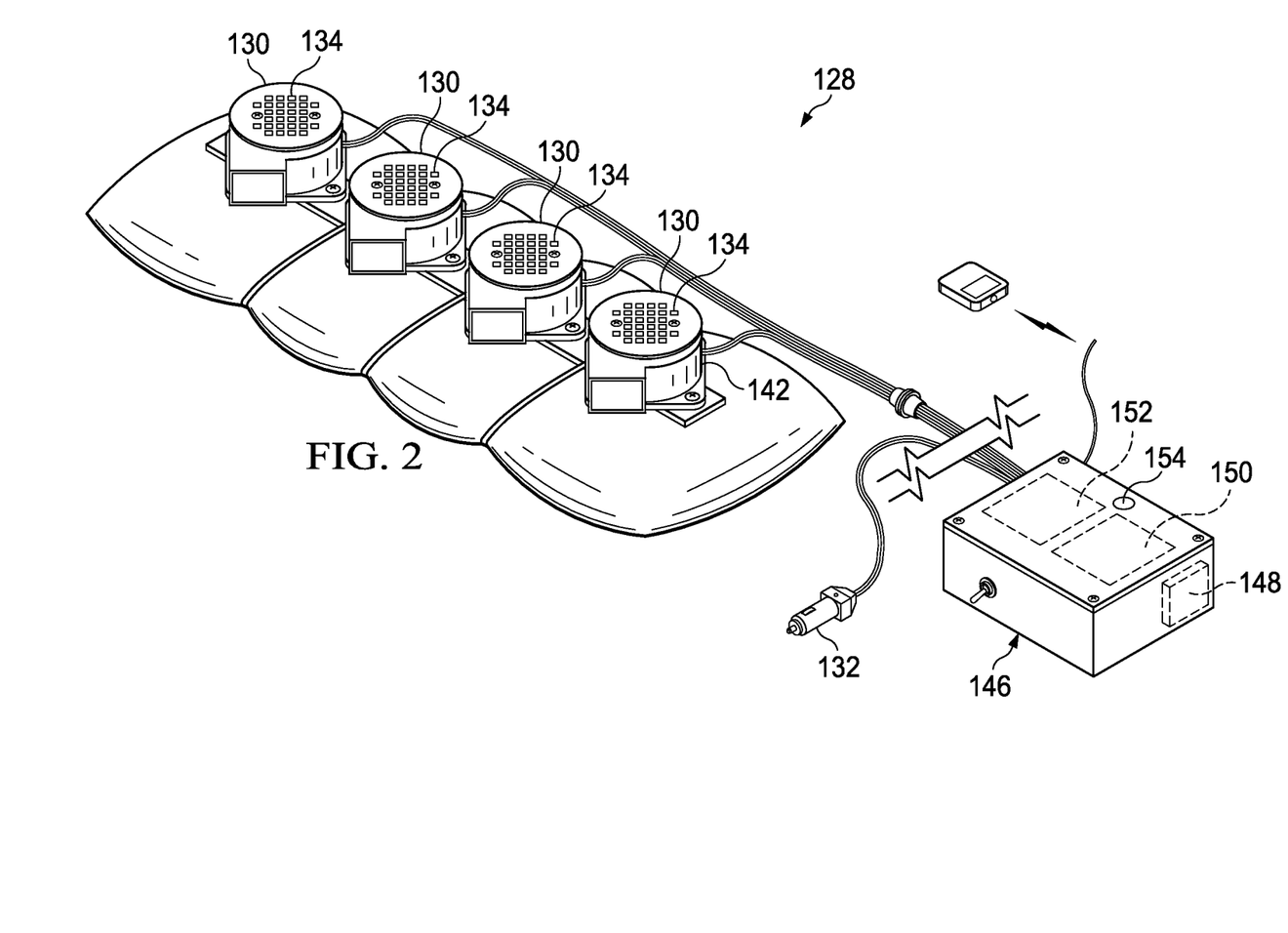
FIG. 2 is a partial view of the apparatus of the invention showing an example of a preferred embodiment of a blower assembly and control module.

The shroud 102 includes provisions for accommodating portable blowers by including at least one, and preferably several, blower ports 126. The blower ports 126 provide passageways by which fluid, in this case air, can be caused to flow into the inflatable chamber 112 from the outside. A blower assembly 128, shown in more detail in FIG. 2, is affixed to the shroud 102 in a position such that one or more blowers 130 may be aligned with the blower ports 126. A close-up view of an exemplary embodiment of a blower assembly 128 is shown in FIG. 2. In this arrangement, the blowers 130 may be used to blow outside air into the inflatable chamber 112 in order to inflate it and maintain it in an inflated state. Preferably, blowers such as, for example, 12V, 0.5 A to 1.5 A, DC blower fans, or equivalent, may be used. Additional blowers 130 may be used for faster inflation. The blowers 130 are electrically connected with one or more power sources, such as a 12 Volt battery, 132, or auto accessory power (cigarette lighter plug), auto accessory power connected to DC to AC adapter for outlet plug-in. Additional 12 volt batteries or battery arrays may also be used for providing increased power to the blowers or for longer operating times. Preferably, a grill 134 protects each of the blowers 130 from ingesting hail or other objects. Rain covers 136 may also be provided for the blowers 130. In presently preferred embodiments, the blower assembly 128 is mounted on the shroud 102 at the rear (trunk or hatch) end at a location about 40% of the distance down from the top of the shroud 102. The blower assembly 128 is held in place on the shroud 102 by suitable means such as a wide elastic band 138 sewn into an opening sized to allow for a circular opening corresponding to the size of the blower grill collar. Preferably, each blower is provided with a rigid (e.g., plastic) cover 136 which stands off from the blower 130 to allow for adequate intake (e.g., about two inches) and extends down below the blower to ensure rain does not enter the blower intake. Preferably, the blower motors are electrically connected to a suitable power source, such as the battery 132, auto accessory power (cigarette lighter plug), auto accessory power connected to DC to AC adapter for outlet plug, as introduced in FIG. 1, which may be placed in the trunk or other compartment of the vehicle 104. In the event the power source 132 is placed in the trunk or other compartment inside a vehicle 104, connecting wires exit the vehicle and are preferably fed through an aperture positioned about 50% down from the top of the inner layer 106 of the shroud 102 and connected to the blowers 130 which are mounted on the blower assembly 128 at the outer layer 108 of the shroud 102. The blowers 130 may alternatively be mounted to a different point on the shroud 102 (e.g., front or side of the vehicle). The power source may also be placed in a pouch incorporated into the shroud or placed under the vehicle. In some cases, it may be desirable to connect the blower assembly and/or power source to the on-board power source associated with the vehicle or to an external power source such as a suitable converter plugged in to a 120 Volt stationary power source.

Again referring primarily to FIG. 2, a control module 146 is connected with the blower assembly 128 for the purpose of providing command and control to the blower(s) 130. Preferably, the control module 146 may be included in an integrated unit with the power source 132. The control module 146 may also include an auxiliary power source, e.g., auxiliary battery 148, designed to power the control module 146 independent from the blowers 130. An activation circuit 150 included in the control module 146 may be used for switching the blower(s) between "on" and "off" state. Preferably, a communication circuit 152 is included for receiving, and in some cases also sending, one or more external signals. An external signal, such as for example, a radio-frequency (RF) signal transmitted by suitable technology may be received by the communication circuit 152 and may be used by the control module 146 to actuate the activation circuit 150. The communication interconnection may make use of wireless, local area network, wide area network, satellite, wire line, or other communication hardware and protocols, or combinations thereof, in order to provide remote access to the control module 146 from any location. The control module 146 preferably includes functionality for logging the location of the apparatus 100. This may be accomplished by means of telephonic, RF, Wi-Fi (a trademark of Wi-Fi Alliance Corporation California), Bluetooth (a trademark registered to Bluetooth Sig, Inc. Corporation Delaware), or other communications means. Location information may also be manually provided to a service provider by a user. The service provider may then transmit relevant information concerning actual and/or predicted weather events to the user. In preferred embodiments of the invention, the location information may be used to alert users of the forecast and/or the actual occurrence of hail or other potentially damaging weather conditions in, or likely to be in, the vicinity of the apparatus. This information may be used to advantage by the user in deciding whether to deploy the apparatus. It is contemplated that in some embodiments, optional features may be included for automatically deploying the apparatus when hail is indicated to be present or imminent. Alternatively, GPS circuitry may be included with the apparatus in order to provide location information.

In some embodiments of the invention, it may be preferable to include one or more sensors 154 with the apparatus. Such sensors 154 may be used to gather and store or report data relating to the state of the inflatable cover apparatus 100, e.g.; inflated/deflated, inflation pressure, blowers on/off, power supply status, etc. Sensors 154 may also be used to gather and store or report data relating to the operating environment, e.g.; location, precipitation, impact events, temperature, barometric pressure, wind speed, and the like.

Figure 3A:
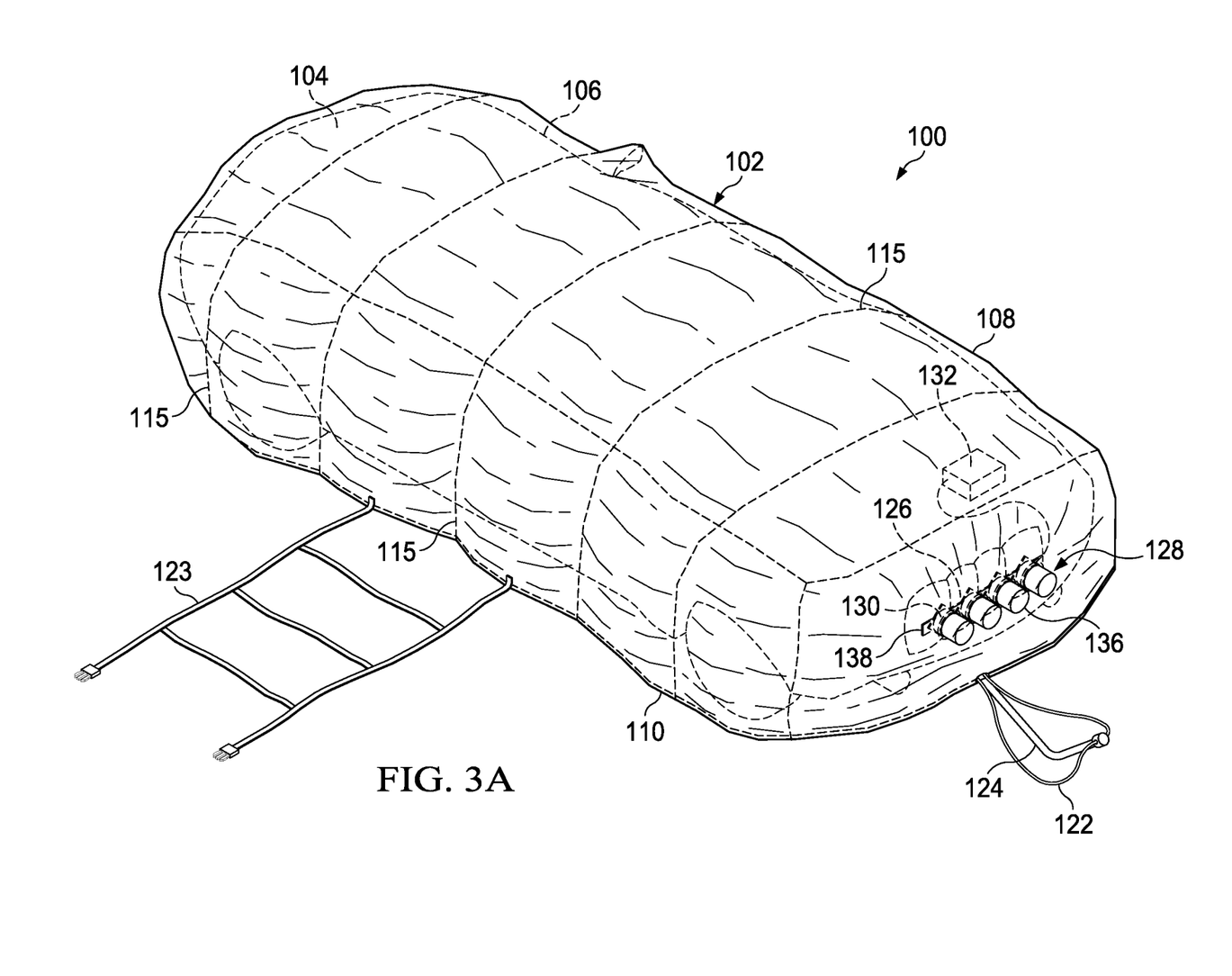
FIG. 3A is a perspective view of an example of a preferred embodiment of inflatable cover apparatus of the invention in a deflated state.

Now referring primarily to FIGS. 3A and 3B, an example of a preferred embodiment of the invention is depicted transitioning from a deflated to an inflated state. In a preferred method of operating the inflatable cover apparatus according to preferred embodiments of the invention, the apparatus 100 is deployed over an object such as an automobile or motorcycle in the deflated state, thereby protecting the object from the elements such as sun, dust, and rain. Typically, as shown in this example the shroud 102 is draped over one end of the object, the rear of the vehicle 104 in this example, and worked forward over the entire object. If the vehicle has a mast antenna or other projection that might obstruct the shroud 102, it may be removed. At a position on the shroud, typically at the front or rear of the vehicle, the drawstring 122 is pulled taut to secure the shroud 102 around the lower edge of the vehicle. Preferably, a strap assembly 123, shown in FIG. 3A, passes beneath the vehicle 104 and attaches to the periphery of the shroud 102 on each side. At an opportune time, such as when a storm begins to approach and/or a warning of possible hail occurs, the blowers 130 may be activated, either manually or remotely, in order to place the shroud 102 in its inflated state. In presently preferred embodiments, inflation is complete in approximately 3 to 4 minutes using a standard battery pack, such as a fully charged NiMH battery pack. Without supplemental power, the shroud 102 may be maintained continuously in an inflated state for about 1-2 hours. Once it is perceived that the potential for hail has passed, the blowers 130 may be deactivated manually or remotely to permit deflation. Faster and more thorough deflation may also be achieved using an opening provided in the shroud 102, such as a Velcro (a trademark registered to Velcro Industries B.V. Limited Liability Company, Netherlands) opening 156 or zipper at the rear of the shroud 102 as shown in FIG. 3B. The blower assembly 128 and control module 146 may also be removed when it is desired to use shroud 102 as a passive, deflated cover. Preferably, the blower ports 126 are then covered to prevent the ingress of water and debris.

Figure 6:
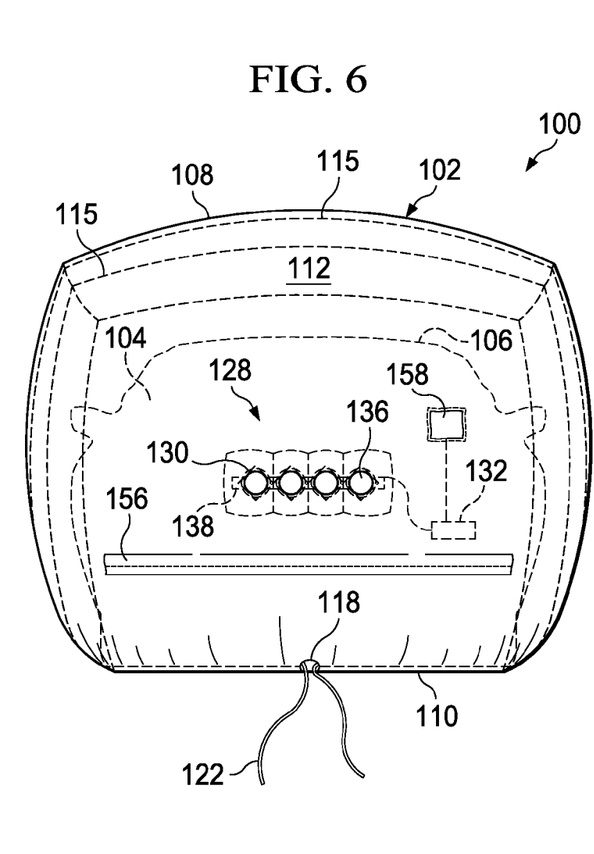
FIG. 6 is a front view illustrating an example of a preferred embodiment of inflatable cover apparatus according to the invention in an inflated state.

It should be appreciated by those skilled in the art that many variations are possible within the scope of the invention and that not all can or need be shown and described in minute detail herein. For example, various arrangements are possible for providing power to the blowers 130 without departure from the invention. The blower assembly 128 may be coupled to a vehicle power system, additional batteries, or to a grid-connected power system. Additionally, energy harvesting apparatus, such as flexible photovoltaic panels 158 as shown in FIG. 6, may be used to provide supplemental power to the control module 146 to ensure that the apparatus 100 may be monitored during periods between deploying events, or for supplemental charging of the power sources 132, 148 during periods of fair weather. In another example of the use of the apparatus 100 of the invention, it is contemplated that the communication circuitry 152 may be used to facilitate activation of the control module 146 to initiate a change in the state of the apparatus 100 by the direct action of a user, such as by transmitting an activate/deactivate signal via telephone, fax, email, SMS (text) message, web-enabled computer application, smart phone application, or any other electronic means. Similarly, the apparatus 100 be operated by the receipt of an electronic signal issued by a weather alerting service, such as for example, a severe thunderstorm warning broadcast by an appropriate authority. In a further variation, the inflatable vehicle cover apparatus 100 may include control logic whereby activation/deactivation may be actuated by the control module 146 in response to real-time conditions detected by sensor(s) 154 based on preselected parameters such as changes in temperature, pressure, wind, impact detection, or other parameters or combination of parameters.

While the making and using of various exemplary embodiments of the invention are discussed herein, it should be appreciated that the present invention provides inventive concepts which can be embodied in a wide variety of specific contexts. It should be understood that the system and methods of the invention may be practiced with various materials and components in a variety of shapes, sizes and formats. For purposes of clarity, detailed descriptions of functions, components, and systems familiar to those skilled in the applicable arts are not included. The apparatus of the invention provides one or more advantages including but not limited to, providing inflatable vehicle cover apparatus capable of protecting vehicles from hail, including hail as large as, or larger than, has ever been recorded. Additional advantages may include communication receiving and/or transmitting capabilities. While the invention has been described with reference to certain illustrative embodiments, those described herein are not intended to be construed in a limiting sense. For example, variations or combinations of features and materials in the embodiments shown and described may be used in particular cases without departure from the invention. Various modifications and combinations of the illustrative embodiments as well as other advantages and embodiments of the invention will be apparent to persons skilled in the arts upon reference to the drawings, description, and claims.

I claim:

1. Inflatable covering apparatus comprising:
    a double-layer shroud having a length and a width, the double-layer shroud configured for encompassing an object, the double-layer shroud having an inner layer and an outer layer connected at their peripheries and wherein the outer layer is larger in area than the inner layer thereby defining an inflatable chamber there between, at least one of the outer layer and the inner layer having a plurality of spaced apart elongated stretchable members with each of the plurality of stretchable members traversing the width of the double-layer shroud such that at least one of the plurality of stretchable members extends from one side of the object to a second side of the object and over the top of the object when the double-layer shroud is placed over the object and further for drawing the shroud inward toward the covered object;
    a drawstring assembly encircling the periphery of the shroud such that the periphery of the shroud may be selectably drawn from an extended state to a constricted state and released from a constricted state to an extended state;
    at least one blower port integrated into the shroud, the blower port(s) providing fluid communication between the inflatable chamber and the outside world;
    at least one blower assembly removably attachable to a blower port, the blower assembly having at least one blower for communicating air from the outside world to the inflatable chamber when attached to the blower port; and
    a control module operably coupled to one or more blower assembly and having an activation circuit for activating one or more blower, the control module further comprising a communication circuit for receiving an external signal issued by a weather alerting service, wherein the activation circuit activates the one or more blowers in response to the receipt of the external signal issued by the weather alerting service.

2. Inflatable cover apparatus according to claim 1 wherein the control module further comprises internet access circuitry.

3. Inflatable cover apparatus according to claim 1 wherein the control module further comprises data transmission circuitry.

4. Inflatable cover apparatus according to claim 1 wherein the control module further comprises electronic sensor apparatus.

5. Inflatable cover apparatus according to claim 1 wherein the control module further operable for at least one of the logging of the location of the inflatable cover and determining the location of the inflatable cover.

6. Inflatable cover apparatus according to claim 1 wherein the activation circuit further comprises circuitry for automatically actuating a blower based on one or more pre-selected parameters.

7. Inflatable cover apparatus according to claim 1 further comprising energy harvesting apparatus operably coupled to a battery.

8. Inflatable cover apparatus according to claim 1 further comprising a power interface for operably coupling the blower assembly to an external power supply.

9. Inflatable covering apparatus comprising:
    a double-layer shroud having a length and a width, the double-layer shroud configured for encompassing an object, the double-layer shroud having an inner layer and an outer layer connected at their peripheries and wherein the outer layer is larger in area than the inner layer thereby defining an inflatable chamber there between, the outer layer having a plurality of spaced apart elastic bands with each of the plurality of elastic bands traversing the width of the double-layer shroud such that at least one of the plurality of elastic bands extends from one side of the object to a second side of the object and over the top of the object when the double-layer shroud is placed over the object and further for drawing the shroud inward toward the covered object;
    a drawstring assembly encircling the periphery of the shroud such that the periphery of the shroud may be selectably drawn from an extended state to a constricted state and released from a constricted state to an extended state;
    at least one blower port integrated into the shroud, the blower port(s) providing fluid communication between the inflatable chamber and the outside world;
    at least one blower assembly removably attachable to a blower port, the blower assembly having at least one blower for communicating air from the outside world to the inflatable chamber when attached to the blower port; and
    a control module operably coupled to one or more blower assembly and having an activation circuit for activating one or more blower, the control module further comprising a communication circuit for sending and receiving radio-frequency (RF) signals, the communication circuit further for receiving an RF signal issued by a weather alerting service, the communication circuit operably coupled to the activation circuit for activating the one or more blowers in response to the receipt of the RF signal from the weather alerting service.

10. Inflatable cover apparatus according to claim 9 wherein the control module further comprises internet access circuitry.

11. Inflatable cover apparatus according to claim 9 wherein the control module further comprises electronic sensor apparatus.

12. Inflatable cover apparatus according to claim 9 wherein the control module further comprises electronic sensor apparatus adapted for sensing meteorological parameters.

13. Inflatable cover apparatus according to claim 9 wherein the control module further comprises electronic sensor apparatus adapted for sensing impact of objects with the apparatus.

14. Inflatable cover apparatus according to claim 9 wherein the control module further comprises control logic configured for activating the blower assembly based on preselected parameters.

15. Inflatable cover apparatus according to claim 9 wherein the control module further comprises control logic configured for deactivating the blower assembly based on preselected parameters.

16. Inflatable cover apparatus according to claim 9 wherein the control module further operable for at least one of the logging of the location of the inflatable cover and determining the location of the inflatable cover.

17. Inflatable cover apparatus according to claim 9 further comprising energy harvesting apparatus operably coupled to the control module.

18. Inflatable cover apparatus according to claim 9 further comprising a power interface for operably coupling the blower assembly or the control module to an external power supply.

19. A protective cover for an object, comprising:
- a shroud having at least a first layer and a second layer, the first layer and the second layer being connected so as to define an inflatable chamber, the shroud being configurable between a deflated state and an inflated state;
- a plurality of spaced apart bands integrated with at least one of the first layer and the second layer of the shroud, the plurality of band to facilitate the releasable securement of the shroud about the object when the shroud is in at least the deflated state with at least one of the plurality of bands extending from one side of the object to a second side of the object and over the top of the object when the shroud is placed over the object;
- at least one blower connected to the shroud, the at least one blower for inflating the chamber; and
- a control module operably coupled to the at least one blower and having an activation circuit for activating the at least one blower, the control module further comprising a communication circuit for receiving an external signal issued by a weather alerting service, wherein the activation circuit activates the one or more blowers in response to the receipt of the external signal issued by the weather alerting service.

* * * * *